Oct. 30, 1962 W. S. EGGERT, JR 3,061,713
METHOD AND APPARATUS FOR MAKING RESISTANCE
WELDS IN T SECTIONS
Filed Dec. 16, 1960
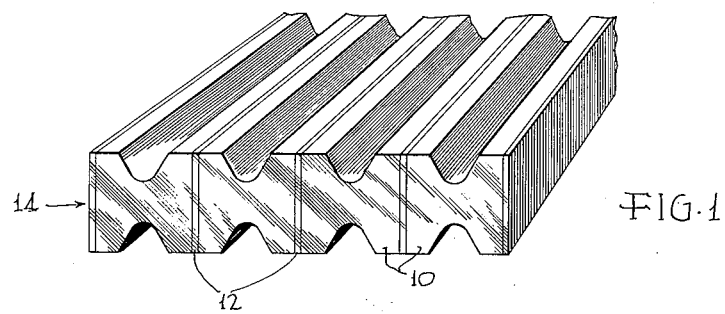
FIG.1
FIG.2
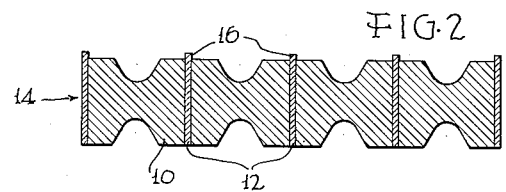
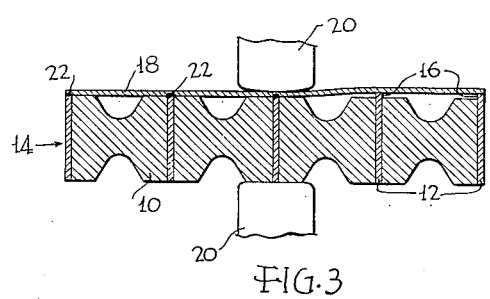
FIG.5 FIG.6
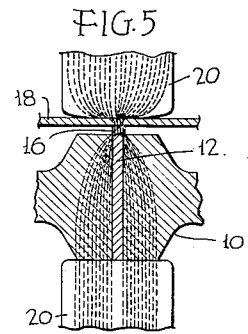 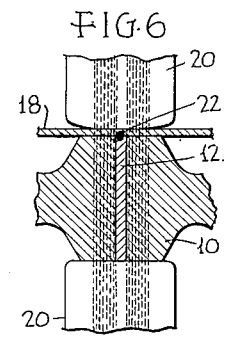
FIG.3
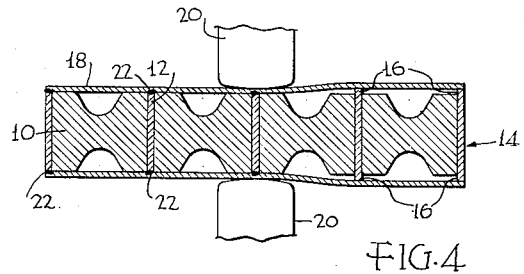
FIG.4
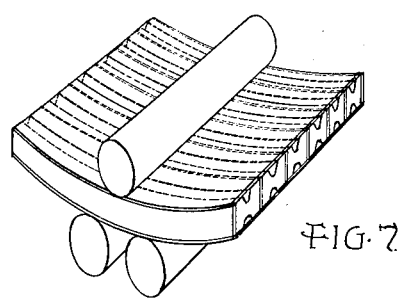
FIG.7
INVENTOR.
Walter S. Eggert, Jr.
BY
John Boswell
ATTORNEY

United States Patent Office 3,061,713
Patented Oct. 30, 1962

3,061,713
METHOD AND APPARATUS FOR MAKING RESISTANCE WELDS IN T SECTIONS
Walter S. Eggert, Jr., Philadelphia, Pa., assignor to The Budd Company, Philadelphia, Pa., a corporation of Pennsylvania
Filed Dec. 16, 1960, Ser. No. 76,221
16 Claims. (Cl. 219—107)

This invention relates to a reinforcing structure for making a resistance welded T-section structural shape and more particularly to a novel removable welding support-structure which permits accurate resistance welding control and the method of making same.

Structural shapes that require the ultimate strength of available metals may generally be made from one of two types of materials. One type of material is heat treated to obtain high strength, and since the hardening process may be easily applied after the structural shape is made, this is the accepted practice. A second type of material is cold-rolled to strengths far in excess of heat treated materials, but is only available in thin sheet form.

Cold-worked materials may be raised from under 100,000 p.s.i. tensile strength to over 350,000 p.s.i. by cold-working but attempts to weld such materials into high strength T configurations have not been successful. Attempts to weld thin cold-rolled material have normalized the material, greatly reducing its strength.

Resistance welding requires that high welding pressure and current be applied across the welding electrodes to form a proper weld joint between materials. Lap joint welds are successfully made between contiguous sheets but even here the weld seam is normalized. However, thin sheets in T configurations have one vertical section subjected to the pressure of the electrodes and the heat of the welding current. The vertical section of such structures will heat excessively and deform under pressure if not supported, resulting in improper weld joints.

It has long been recognized by those skilled in the art of resistance welding that the most efficient resistance weld is accompanied by forging the two sections into each other at the weld joint. Forging insures that fusion is uniform and supplies metal to the weld joint. The forging effect has been minimized in thin sheet T sections to avoid crushing the vertical section or to prevent irregularities in the horizontal section.

Formerly it has been the practice to make a sharp point at an edge portion of the vertical section to concentrate the weld joint at a small area. This method does not produce a weld joint whose cross section is equal to that of the vertical section. Another method has been to avoid making the T joint. A turned flange or L section may be welded to a flat sheet by means of lap joint resistance welds. However, if a vertical section of thin sheet material is required to support the pressure of the welding electrodes the vertical section will heat excessively and deform, resulting in an improper weld joint. In order to avoid structural failure of fragile vertical sections, welding mandrels may be applied to support the turned flange. When welding mandrels are provided to support fragile vertical sections they may also be used as an electrode to isolate individual weld joints so that only one weld joint is under control at any one time. If several weld joints were incorporated in series between electrodes there is no method to insure that each weld joint is controlled and made uniform.

Resistance welding control techniques usually require elaborate devices which are either of the pre-set input type or the feedback control type. The latter type monitors the weld progress by physical measure of voltage or resistance, etc. and controls some variable which affects the weld condition. Heretofore both the pre-set and feedback type controls could not insure the reliable control of two weld joints in series, nor could these control devices compensate for variations of internal resistance between different weld joints.

It would be desirable to provide a supporting structure for a resistance welded T structure in a sandwich panel which would facilitate resistance welding without crushing the core; enable the sandwich panel to be formed to a predetermined curvature without structural failure; and be removable after the sandwich panel is assembled and formed.

It would be further desirable if the supporting means provides a means for controlling a plurality of weld joints simultaneously; enables forged and fused resistance welds to be made without affecting the surface of surface skin sheets; and produces weld joints of uniform maximum efficiency.

Therefore, it is a general object of the invention to provide a novel sheet supporting structure which serves as a support and a control means during welding.

It is a more specific object to provide a core support means for producing a plurality of uniform forged and fused resistance welds simultaneous in series.

It is a more specific object to provide a core support means for producing high reliability in weld joints without the requirement of elaborate welding controls.

It is a further object to provide a novel core support means which enables welding and contour forming of a sandwich panel and is removable from the finished panel.

It is a further object to provide a means for producing forged and fused resistance welds with surface sheets without deforming the surface sheet at the weld joint.

It is a further object to provide a method for making T section welded structures from cold rolled sheets with negligible loss of the cold rolled structural strength.

Structures constructed in accordance with the invention are stronger than shapes made heretofore and may in general comprise a sheet support piece connected by an electrical conductive bonding agent to a first sheet of a structural shape, said sheet of said shape protruding a predetermined distance beyond the connected support, another sheet placed adjacent said first sheet at said protrusion to form an abutting T section to be welded, and electrodes providing pressure and current across said abutting sheets whereby said latter sheet is forged and fused into the weld joint of said protruding sheet a predetermined amount.

Other features and objects of the invention will be found throughout the more detailed description of the invention which follows. Those novel features believed descriptive of the nature of the invention are described with particularity in the appended claims. To more clearly portray the invention and its manner of operation the description is supplemented with the accompanying drawings:

FIG. 1 is a perspective view of the novel core support spacers attached between vertical support sheets to form a core assembly.

FIG. 2 is an elevation of the assembly of FIG. 1 after being chemically etched on one side.

FIG. 3 is an elevation of the assembly of FIG. 2 showing a method of resistance welding a single skin sheet to the vertical support sheets.

FIG. 4 is an elevation of the assembly which has been chemically etched on both sides showing the method of resistance welding two skin sheets to the vertical support sheets simultaneously.

FIG. 5 is a partial elevation of the assembly of FIG. 2 showing the manner in which current is concentrated in the protruding edge of, and shunted around, the vertical support sheet.

FIG. 6 is a partial elevation of the assembly of FIG. 2 showing the manner in which current is shunted around the weld joint and the vertical support sheet.

FIG. 7 illustrates one economical way of forming the welded sandwich structure between rollers.

Referring now to FIG. 1 showing a plurality of preferred electrical conductive spacer-support pieces 10 attached by electrical conductive bonding means to a plurality of vertical sheets 12. The assembly 14 of FIG. 1 may be flat or may be made over a contour fixture to any predetermined shape. Either shape may be processed in the same manner as will be explained.

Support pieces 10 are usually made of a good grade of copper but may be made of any material which has a high heat conductivity and high electrical conductivity compared to the material being welded. Bonding means are usually brazing materials or high temperature solders although conductive adhesives could be used for some applications. The vertical sheets 12 can be cold rolled stainless steel and could be cold-worked to tensile strengths in excess of 350,000 p.s.i. if desired.

Assemblies such as that shown in FIG. 1 may be fabricated without elaborate tools and jigs for it has been found economical to fabricate an assembly and machine the faces of the assembly to a desired finish. There is no requirement that the assembly be of constant cross-section or of fixed flat contour. Machining creates the condition where vertical sheets 12 are flush with support pieces 10.

The smooth surface core assembly 14 is etched by a chemical bath which dissolves the support piece without affecting the vertical sheets. Etching is controlled by the bath concentration and the time of exposure to the bath. As shown in FIGS. 2 and 5 the vertical sheet 12 is protruding beyond the support piece. A clean protrusion 16, usually three to fifteen thousands of an inch depending on the thickness of the sheet being welded, is easily obtained by controlling the chemical bath. As will be explained later some tapered shapes may be etched to different degrees leaving protrusions of different dimensions.

An alternative method of fabricating the assembly 14 with protrusions 16 would be to assemble accurately machined vertical sheets 12 and support pieces 10. This method is very practical when the protrusions 16 are large.

Once the spacer-support piece 10 is recessed below the protruding edge of the vertical sheet 12 the skin sheet 18 may be attached by resistance welding as shown in FIGS. 3 and 5. Wheel electrodes 20 may have flat faces which insure a flat uniform finish on the welded skin sheet 18. When welding two skin sheets 18 to the same core assembly 14 it may be necessary to perform the welding process in two steps as shown in FIG. 3 where only one side of the assembly was initially etched and welded. Whenever the two skin sheets are not of the same thickness and one skin sheet is much thicker than the other one skin sheet 18 is preferably welded first, the other side of the assembly is then etched and the second skin sheet 18 welded to the assembly 14. Preferably the thicker skin sheet is welded to the assembly first.

Should the two skin sheets 18 be approximately the same thickness it is possible to simultaneously weld the two sheets 18 to the assembly 14. First, both faces of the assembly are prepared by etching, or an alternative method, providing protruding edges 16 as shown in FIGS. 2 and 4. Pressure is applied to the sandwich panel by the wheel electrodes 20 and a current sufficient to fuse the vertical sheet 12 to the skin sheets 18 is applied. As shown in FIG. 5 the protruding edge 16 of vertical sheet 12 begins to melt at the abutting contact point with skin sheet 18 due to current concentration in the protruding edge. The melted weld nugget progresses into the vertical sheet 12 for the pressure of the welding wheel electrode forces skin sheet 18 into the weld nugget 22. When the protrusion has completely melted the electrode forces skin sheet 18 flush upon the surface of the conductive spacer 10 as shown in FIG. 6. The weld nugget on the inner face of the skin sheets is as thick as the vertical sheet but the annealed weld joint is kept very small producing a high efficiency joint.

As shown in FIGS. 5 and 6 current passing between the electrodes seeks the path of least resistance. When current is first applied to an unwelded joint, the point of maximum resistance is in the total current path at the juncture of the sheets, causing the protruding edge 16 to melt first. The current does not tend ot heat the remaining portion of the vertical sheet for the path of least resistance is through the conductive bonding means and the conductive spacer-support piece 10. When the weld joint is completed the current bypasses the vertical sheet 12 passing through supports 10. Support pieces 10 serve four basic purposes: (1) they support the thin vertical sheet 10 under pressure of the electrodes; (2) they conduct current away from the main body of the core sheet and concentrate the current path at the weld joint; (3) they serve as a cooling means to prevent the vertical sheet and skin sheet from annealing due to the heat of welding; (4) they shunt the current from the weld joint when the skin sheet comes in flush contact with the support piece upon termination of the weld joint, thus effectively serving as a cut-off control for the weld joint.

Welding of two skin sheets 18 to an assembly 14 may be conducted simultaneously as shown in FIG. 4. When welding current is initially applied to two joints in series both joints tend to melt forming weld nuggets. One of the joints will heat faster than the other, allowing the electrode to press one skin sheet upon the support piece first. The joint that is completed first is cut-off by the shunt action of the conductive support piece allowing the unfinished weld joint to continue to completion.

It is obvious that several weld joints may be made simultaneously in series between a single pair of electrodes. When the novel support pieces 10 are employed each weld is insured of the proper weld-nugget in a forged and fused weld joint.

The invention may be applied in an alternative manner. A plurality of weld joints may be made simultaneously in parallel by employing an electrode or series of electrodes that cover an area or number of contact points. Such an application requires more instantaneous power.

After the sandwich panel is welded and before the support pieces 10 are removed the panel may be roller-formed as shown in FIG. 7, or the panel may be stretch-formed or die-formed without danger of internal core structure failure.

The finished sandwich panel may be exposed to a chemical bath which will remove the support pieces without attacking the sandwich panel material leaving a light high strength sandwich panel. Had the support piece been composed of low temperature conductive materials they could easily be removed by heating without annealing the finished panel.

Tapered skin sheets may be made from uniform thickness sheets by exposing successive areas to a chemical bath for longer time periods. When tapered sheets are welded to a single vertical sheet section or several sheets the protrusion should become smaller as the skin sheet diminishes in thickness. Under such conditions the support piece being etched is slowly removed from a chemical bath allowing the end first removed to be etched the least amount.

Thus, tapered wing spars and cantilever structural shapes as well as non-uniform cross-section sandwich panels may be easily made by the present invention.

Elaborate welding controls are not required to produce uniform and consistent weld joints. When welding with opposite disposed welding wheels it is only necessary that the weld wheels feed slow enough to produce complete fusion at the weld points. The shunting action of the support pieces prevents burnouts due to overheating. A resistance measuring device may be incorporated across the welding electrodes to monitor the drop in resistance that occurs when the support pieces act as current shunts. This provides a means for employing automatic weld controls if so desired.

Although the invention has been illustrated with a constant cross section sandwich panel it is limited to neither a sandwich panel or a constant cross section. The invention is applicable to all forms of structural shapes when forged and fused resistance welds are required, and is especially applicable to the resistance welding of thin cold rolled sheets where approximately 95% of the strength of the cold worked material is preserved in the welded section.

It is to be understood that various modifications and changes may be made in the method of making forged and fused welds employing conductive support pieces without departing from the scope of my invention, some of the novel features of which are defined in the appended claims.

What is claimed is:

1. The method of making forged and fused resistance welded sandwich panels comprising, bonding a plurality of vertical sections to a plurality of electrically conductive support members by means of an electrically conductive bond, machining the assembly of sections and supports to provide supports and sections of equal heights, etching the electrically conductive support members in a chemical bath to provide recessed supports and protruding sections, placing a skin section over the protruding sections, pressing the skin section against the protruding sections while passing sufficient electric current through the sections to resistance weld the abutting joint, and terminating the resistance weld when the skin section abuts on said supports.

2. The method of making a plurality of forged and fused resistance welds simultaneously with a single pair of electrodes comprising the step of: attaching by means of a conductive bonding agent conductive support means to a vertical section to provide an assembly to be welded, machining the surfaces of the assembly until the adjacent conductive support means are equal in thickness to said vertical section, etching the support means in a chemical bath until said sections protrude beyond said support means, placing surface sheets abutting said protrusions, simultaneous resistance welding said surface sheets to said abutting protrusion, and terminating the resistance weld when the surface sheets abut on said support means.

3. The method of forging and fusing welding a web member to a transverse body member by concentrating current flow at the joint to be welded, which comprises, integrally bonding at least one side of said web member to a highly conductive massive support member, providing a short edge extension of said web member protruding beyond said support member for abutting the welding to said transverse body member, pressing the surface of said transverse body member against the protruding edge of the web member, passing an electric current through the abutting surfaces of said web and body member to form a joint, and terminating the resistance weld when the transverse body member abuts on said massive support member.

4. The method of making a forged and fused resistance weld in thin cold rolled sheet material without annealing the major portion of the sheet material comprising the steps of: attaching an electrically conductive support piece to a vertical section so as to provide a protruding edge of said section above said support piece, applying an abutting section normal to said protruding edge, passing electrical current through said abutting section at said protruding edge and simultaneously forcing said abutting section into a forged weld, and terminating the resistance weld when the abutting section abuts on said support piece.

5. The method of making a forged and fused resistance weld in thin cold rolled sheet material with negligible loss of strength in the sheet material comprising the steps of: brazing with an electrically conductive compound a support piece of high electrical conductivity to a vertical section of relatively low electrical conductivity so as to provide a protruding edge of said vertical section above said support piece, applying another section normal to said vertical section forming a T junction, clamping the T junction of said sections between a pair of electrodes so as to form an electrical path therebetween through said T junction and said support piece, and applying pressure and current to said junction to form a resistance weld until said other section abuts on said support piece.

6. A method of producing forged and fused resistance welds which comprises, shaping a first and a second metal sheet to be welded in a T configuration, attaching to the first of said sheets an electrically conductive support piece, removing a small portion of said support piece along one edge of said first sheet, and resistance heating the T section at the unsupported portion section of said sheet to form a resistance weld while simultaneously forcing said second sheet to abut on said support piece.

7. A method of controlling forged and fused resistance welds comprising, joining by an electrically conductive bond a highly conductive support means to a protruding flange piece, welding by resistance welding a lateral piece to said protruding flange piece, and pressing said lateral piece into said protruding flange piece while welding until said lateral piece abuts against said support piece, whereby the welding current bypasses the weld joint terminating the welding process.

8. A method of controlling two forged and fused resistance welds in series comprising, joining by an electrically conductive bond a high conductive support means to a flange piece, providing protruding edges of said flange piece beyond said support means, welding by resistance welding section pieces to said protruding edges of said flange pieces, and pressing said section pieces into said protruding flange pieces until said section pieces abut against said support means, whereby the welding current bypasses the respective weld joints when the respective sections abut the support means terminating the respective weld joint progress.

9. A method of producing forged and fused welds which comprises, attaching by an electrical conductive contact means a highly conductive support piece to a vertical section, providing a short protruding edge of said vertical section beyond said support piece, applying a surface section normal to said vertical section in abutting relation, and applying pressure and current to said abutting sections to produce a forged and fused weld joint until said surface section abuts on said support piece.

10. The method of making a compound curvature in a fragile sandwich panel comprising the steps of interleaving vertical core sections with electrically conductive support pieces, bonding the interleaved pieces and sections together with an electrically conductive bonding agent to form an assembly, etching the assembly in a bath to recess said support pieces, and resistance welding by forging and fusion face sheets to said assembly to form a fragile sandwich panel supported internally by said support pieces until said face sheets abut on said support pieces.

11. The method according to claim 10 wherein said sandwich panel is further stress formed by forming tools.

12. The method according to claim 11 wherein said sandwich panel is further treated after bending to remove said support pieces.

13. The method of making forged and fused resistance welded tapered shapes, comprising, bonding a vertical section to electrically conductive support means with an electrically conductive bonding agent, machining the assembly formed of the support piece and the core section to provide a support and section of equal height, etching the electrically conductive support member in a chemical bath by controlled time exposure to provide a tapered protruding section, placing a tapered skin section over the protruding section, pressing the skin section against the protruding section while passing sufficient electric current through the sections to resistance weld the abutting joint, and terminating the resistance weld when the skin section abuts on the support piece.

14. The method of making forged and fused resistance welded shapes, comprising, providing a plurality of vertical core strips in a spaced pattern, filling the spaces between said core strips with an electrically conductive molten metal to form a unified core assembly, machining the core assembly to a uniform smooth surface, etching the assembly in a solution which will dissolve the electrically conductive metal faster than the core strips to provide protruding edges of said core strips, placing a skin sheet over said assembly, pressing the skin sheet into said protruding edge while passing sufficient electric current through an edge to melt the edge of a core strip, and forging and fusing said skin sheet into said edge until said skin sheet abuts and is supported by said conductive metal.

15. The method according to claim 14 wherein said conductive metal forms an electrical shunt around said edge and said core strip, and the electrical current is terminated after said skin sheet abuts on said conductive metal.

16. The method of making forged and fused resistance welded sandwich panels, comprising, interleaving electrically conductive support piece between core sheets, providing protruding edges of the core sheets above the level of the interleaved electrically conductive support pieces, placing a skin sheet over the edges of the core sheets so as not to touch the support pieces; clamping the skin sheet and core sheets between welding electrodes, applying pressure to the skin sheet and the core sheets by means of the electrodes, passing a welding current through said electrodes to cause the edges of the core sheets to melt, and forging the skin sheet into the melted edge of the core sheets until said skin sheet abuts on said support pieces.

References Cited in the file of this patent
UNITED STATES PATENTS

| | | |
|---|---|---|
| 1,659,920 | Murray | Feb. 21, 1928 |
| 2,880,304 | Campbell | Mar. 31, 1959 |